May 10, 1955     J. S. BEST     2,708,119
ADJUSTABLE ECCENTRIC MECHANISM FOR VEHICLE WHEEL
Filed April 5, 1952
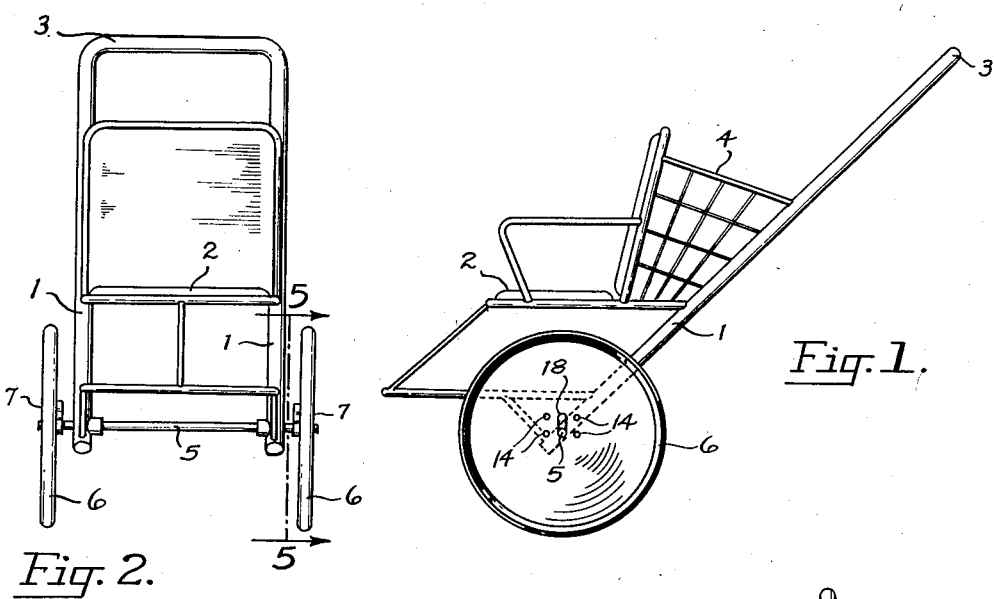
Fig. 1.
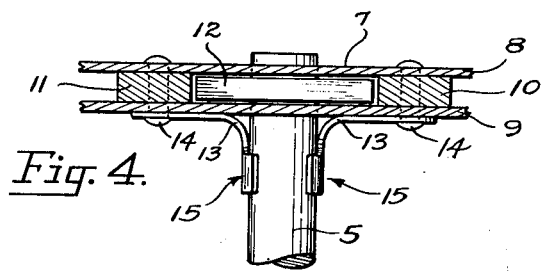
Fig. 2.
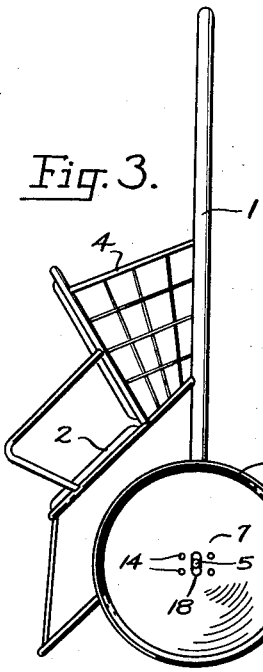
Fig. 3.
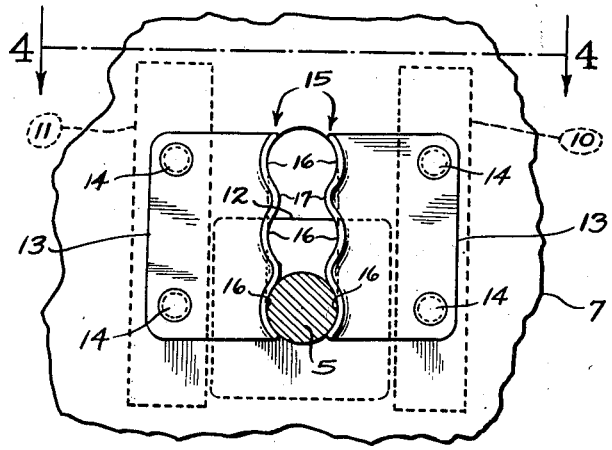
Fig. 4.
Fig. 5.
INVENTOR.
James S. Best
BY
Atty.

United States Patent Office 2,708,119
Patented May 10, 1955

2,708,119

ADJUSTABLE ECCENTRIC MECHANISM FOR VEHICLE WHEEL

James S. Best, Portland, Oreg.

Application April 5, 1952, Serial No. 280,714

7 Claims. (Cl. 280—47.21)

This invention relates to a wheeled vehicle adapted to travel either with or without an eccentric, up and down motion. More particularly stated, this invention is directed to a novel wheel and axle assembly which can be adjusted to an off center position to cause a vehicle to travel, variably and selectively, with a smooth, straight and level motion, a vertical bouncing, wave-like motion, or a side to side, eccentric rocking motion. Thus, by way of example, such a wheel and axle assembly may be used with a carrying cart, a baby carriage, or a stroller (when adjusted for smooth travel), with an amusement or play toy or with a rocking type vehicle to induce somnolence (when adjusted to travel with a bouncing or rocking motion), or with a combination vehicle which will serve, selectively, as any of these devices.

Most of those young parents living in urban areas are quite familiar with and have pushed the conventional two and four wheel stroller and baby carriage type vehicles in which young children ride while the parents shop or stroll. Almost equally as well known are those eccentric or bouncing type vehicles which are similar to strollers or baby carriages but which employ off center or eccentric wheels and axles in order to serve as toys, rocking carriages, or amusing toys and vehicles for children (see for example, the United States Patent to A. J. Grant, 2,523,567, and the United States Reissue Patent to N. Chapdelaine, 15,404). A majority of both types of these vehicles are specialized and of narrow utility in that they serve but one, limited function. Thus, those parents wishing to carry groceries, wheel an infant, or, for other reasons, to obtain a smooth, level travel motion must employ the well known stroller, baby carriage, or the like. If, conversely, a bouncing, wave-like travel motion is desired, the parent must employ a different vehicle. This calls for the purchase of a second vehicle which is designed primarily for amusement purposes. On the other hand, those vehicles hitherto known which serve both functions above described, are unduly complex to the point of impracticality. The obvious result of this complexity is that the initial cost of previous combination vehicles has necessitated a sale price which is beyond the means of many parents. Accordingly, having in mind the diversified and specialized provisions of these prior structures and having in mind the disadvantages inherent therein, it is one object of the instant invention to provide a combination vehicle which is adjustable, in a novel manner, in order to serve either as a stroller or baby carriage or as a child's toy or amusement device.

A further object of my invention is to provide a simplified, off center wheel and axle adjustment structure which can be incorporated with and carried by any conventional vehicle, all to the end of providing an inexpensive, dual purpose vehicle which is available, price-wise, to a majority of young parents.

To this end, I have invented a novel vehicle which is adapted to travel, selectively, by effecting a simple adjustment, with or without a vertical bouncing motion or a side to side rocking motion. In brief summary, the novel structure which bottoms this function includes an elongated straight axle member having an adjustably off center wheel mounted on each end thereof. Thus, each of the wheels is provided with an elongated slot which extends radially out from the center thereof and through which one end of the axle projects. A novel retention or grip type bracket is mounted adjacent each such slot and is provided with a plurality of operative holding devices. Each of these holding devices, in turn, is correlated to one radial mounting position for the end of the axle, each such position being located at or a given distance out from the center of the wheel. Thus, the axle physically is held against inadvertent radial displacement within the slot by the retention bracket and the holding devices on each wheel. However, by effecting a simple adjustment, the axle may be moved radially within the slot from one holding device to another and from one position to another with respect to the center of the wheel. Further, since the wheel adjustments are independent, one of another, the position of one end of the axle is independent of the position of the other end of the axle. Thus, either or both wheels may be centered and either or both may be off center. For example, with both ends of the axle held at the centers of the wheels, the vehicle will travel with a smooth, steady motion; with both ends of the axle held equal radial distances out from or eccentric to the center of the wheels, a vertical bouncing motion will be produced; and, with the axle ends held at differing distances from the centers of the wheels, a side to side rocking motion will result.

In this connection, it is a further object of my invention to provide, in combination, a vehicle which is adapted to travel with or without either a vertical bouncing motion or an eccentric, side to side, rocking motion, an elongated straight axle member which will support the vehicle and operatively carry a wheel at each end thereof, and adjustment means which will be carried by each of the wheels selectively to adjust, in a radial direction toward and away from the center of each wheel, the end of the axle carrying that wheel whereby either or both wheels may be carried, selectively, in an eccentric or a concentric relationship with respect to the longitudinal axis of said axle.

The above and other desirable objects, capabilities and advantages inherent in and encompassed by the invention will become apparent from the ensuing description, taken in conjunction with the accompanying drawings, wherein:

Figs. 1 and 2 are related side and front views, respectively, showing an exemplary two-wheeled vehicle incorporating the novel features of the instant invention;

Fig. 3 is a side view similar to Fig. 1 but indicating the position of the vehicle when the retention means on the wheel is to be adjusted or shifted either to change the travel motion of the vehicle from smooth to bouncing or vice versa;

Fig. 4 is an enlarged detail view, in substantial compliance with the section line 4—4 of Fig. 5, showing one end of the axle upon which the wheels and retention means are mounted and indicating the manner in which the retention means partially encompasses the axle to hold the same against inadvertent radial displacement; and Fig. 5 is an enlarged detail, taken substantially on the line 5—5 of Fig. 2, showing the manner in which the retention means flange elements bound a plurality of radially spaced recesses and projections within which the axle and accompanying slide member are mounted.

As exemplary of those vehicles which may incorporate the novel wheel and axle structure of my invention, I have shown, in the drawings, a simplified stroller type vehicle. This stroller includes the usual forked frame 1 having a seat 2 mounted thereupon and carrying a push bar or handle 3. Further, if desired, a grocery or carrying basket 4 may be mounted upon the frame 1 directly behind the seat 2. Thus, in accord with my inventive objects, the vehicle may be used as a bouncing device by making the proper adjustment and seating a child in the seat 2 where he will be entertained and amused by the wave-like motion as the vehicle travels forward. On the other hand, the vehicle may be used as a stroller or a carry-all by making the proper adjustments so a smooth, straight and level travel motion is defined.

Adjacent the lower ends of the forked frame member 1, I prefer to mount an elongated straight axle member 5. The simplicity of such a straight, rodlike axle is of importance to my invention as will hereinafter appear. Thus, the axle member 5 either may be a live axle, in which case journal bearings will be provided where the axle pierces the forked frame 1, or it may be a dead axle, in which latter case the axle and frame will be made an integral unit, as with a force fit or integral casting. In either event, the axle 5 functions to carry, at the ends thereof, a pair of wheels 6, each of which has a hub or central portion 7. It is this hub or central portion 7 which carries the novel means allowing a radial or off center adjustment of the wheel upon the axle so the vehicle, selectively, may define the above-described motions.

Turning now to Figs. 4 and 5, I have therein shown the manner in which the central hub portion 7 includes two typical plate or disk elements 8 and 9 which are spaced laterally one from another. Intermediate these plates, I mount a pair of parallel guide bars 10 and 11. Intermediate the guide bars and intermediate the plates 8 and 9, I slidably mount a square or noncircular slide member 12. This slide member is free to move along the wheel radially in one direction but is restricted, by the guide bars 10 and 11, to prevent movement at an angle thereto.

Overlying the guide bars 10 and 11 (see Fig. 4) and secured against the outer face of the plate 9, I employ four rivets 14 to mount a pair of flexible retention brackets 13. Each of the brackets 13, in turn, is provided with a laterally protruding, contoured flange portion 15. Each pair of flange portions 15, by virtue of the contoured configuration, bounds a plurality of radially spaced recess means 16 which are separated, one from another, by a plurality of projections 17. As an inspection of Figs. 4 and 5 will make apparent, the ends of the axle 5 is accommodated within one of the recess means 16 and, because of the flexible nature of the flanges 15, is movable radially to and from the other recess means. Thus, by way of example, the flange portions 15 may be made of spring steel and may be adjusted to grip the axle 5 with a resistive force of 100 pounds.

As best shown in Figs. 1, 3 and 5, the plates 8 and 9 are pierced by an elongated radial slot 18 which extends across and radially beyond the center of each wheel 6. That is to say, the end of the axle 5 is shown in Fig. 1 as it appears while protruding through the slot 18 and through the exact center of the wheel 6. From this figure, it will be evident that the slot 18 extends radially out and beyond the center of the wheel to provide for the eccentric or off center mounting and the bouncing motion hereinafter described.

Two separate assemblies are practical with the structure thus far described. Thus, in my preferred embodiment, the axle 5 is a live or revolving axle member which is journaled in the ends of the forked frame member 1 and the noncircular slide members 12 are fixed, as by a force fit, to the axle ends. Thus, the axle, the noncircular slide members 12, the various guide bars 10 and 11, and the retention brackets and flanges all will rotate, as an integral unit, with the wheels 6. In this assembly and with the axle 5 disposed in that recess 16 which is at the exact center of the wheels 6, the vehicle will travel with a smooth, steady motion while the parent or operator pushes on the handle 3. Such a smooth travel would be necessary, for example, if groceries or other objects are carried in the basket 4 or if a very young child were seated in the seat 2. On the other hand, if a parent wishes to amuse a somewhat older child, the vehicle first is turned to the position shown in Fig. 3 and a substantial vertical force is exerted downwardly upon the axle 5, as with the foot. This vertical force will move the axle 5, within the slot 18, from the lowermost recess 16 in Fig. 5 (the upper position in Fig. 3) to the next recess thereabove and will dispose the axle in a position which is eccentric with relation to the center of the wheels 6. Thereafter, the vehicle will travel with a vertical bouncing movement since both of the wheels 6 are off center or eccentric with respect to the axle. As is apparent, the amplitude of this bouncing movement may be increased by moving the axle 5 into the topmost recess 16 (Fig. 5), to further amplify the eccentric disposition of the wheels. Many of those vehicles hitherto known did not provide for this amplitude adjustment.

As a second, optional construction, the axle 5 may be a dead or nonrevolving axle which is fixed rigidly to the forked frame member 1. Thus, the noncircular slide members 12 and the flanges 15 will become journal members which turn with the wheels while the axle remains fixed. That is to say, if the axle 5 is fixed to the frame 1, the wheels 6, the flanges 15, the retention brackets 13, and the noncircular slide members 12 will rotate about the axle 5 rather than with the same. An adjustment of this structure, from smooth to bouncing travel, is made in the same manner as above described.

With either construction, it is to be noted the ends of the axle 5 may be adjusted so that one end thereof will be more eccentric than the other end. Thus, one end will ride in a recess 16 which is a first radial amount off center while the other end will ride in a different recess which is a second radial amount off center. Thereafter, as the operator pushes the vehicle, a side to side, swaying motion will be imparted thereto due to the varying eccentricity of the wheels 6 with respect to one another. This swaying or rocking motion also may be varied in amplitude and, if desired, the results thereof may be used to induce somnolence.

In conclusion, it will be seen that I have provided an exceptionally simple wheel and axle assembly which will adapt a vehicle to travel, by effecting a simple adjustment, with or without a vertical bouncing motion or a side to side rocking motion. In effect, this assembly allows a vehicle to be employed either as a conventional stroller, baby carriage, or push cart or as an amusing toy or vehicle. Further, because of the simplicity of this structure, the cost thereof can be kept at a minimum so as to be available, price-wise, to most young parents.

I claim:

1. In combination, a vehicle adapted to travel with or without either a vertical bouncing motion or an eccentric, side to side, rocking motion, an elongated axle member supporting said vehicle and operatively carrying a wheel adjacent each end thereof, and means separately carried by each of said wheels independently and selectively for adjusting, in a radial direction toward and away from the center of each wheel, the end of the axle carrying that wheel whereby either or both wheels may be carried, selectively, in an eccentric or a concentric relationship with respect to the longitudinal axis of said axle, each said means including a flexible flange element having lateral projection means thereon for partially encompassing that portion of said axle member adjacent thereto.

2. In combination, a vehicle adapted to travel with or without either a bouncing or an eccentric rocking motion, an elongated straight axle member having a wheel mounted upon each end thereof, and independent means carried by each said wheel selectively for adjusting the individual wheels radially with respect to said axle, the means upon each said wheel comprising; an elongated radial slot extending laterally through said wheel from side to side and extending longitudinally across the center of said wheel from a point spaced radially out therefrom, said axle being operatively carried within and projecting laterally through said slot, and flexible retention means pendent from said wheel for preventing inadvertent radial movement of said axle within said slot, said retention means including a plurality of recess means spaced radially one from another and each adapted partially to encompass and to retain said axle in a selected position with respect to the center of said wheel.

3. A round vehicle running wheel adapted, selectively, to cause a vehicle to travel with a vertical bouncing motion, comprising; a hub portion on said wheel, a radially elongated opening extending through said hub to receive an axle, and retention means mounted upon said wheel and aligned with said opening for holding said axle selectively in a position concentric with or eccentric to the center of said wheel, said retention means including a flexible flange element having lateral projection means thereon for partially encompassing said axle.

4. A round wheel having a hub portion carrying means for effecting a radial adjustment of said wheel upon an axle, said means comprising an elongated slot piercing said hub laterally and extending radially across the center of said wheel from a point spaced radially out from said center, a pair of mated retention brackets secured to one face of said wheel and arranged one to each side of said radial slot, a flange element projecting laterally out from that margin of each of said brackets which lies adjacent said slot, said flange elements together bounding a plurality of projections and radially interconnected recess means adapted partially to encompass said axle and retain the same against radial movement, said axle being operatively carried in a selected one of said recess means and projecting laterally through said radial slot.

5. In a vehicle which is adapted to travel, selectively, with a bouncing or a smooth motion, a round wheel having a hub portion carrying means for effecting a radial adjustment of said wheel upon an axle, said means comprising; an elongated slot piercing said hub laterally and extending radially across and beyond the center of said wheel, a pair of mated retention brackets secured to one face of said wheel and arranged one to each side of said radial slot, a contoured flange element projecting laterally out from that margin of each bracket which lies adjacent said slot, said flange elements together bounding a plurality of projections and radially interconnected recess means adapted partially to encompass said axle and retain the same against radial movement, said axle being operatively carried in a selected one of said recess means and projecting laterally through said radial slot, said flange elements and projections being flexible to accommodate a radial adjustment of said axle from one recess means to another by application of a substantial radial force to said wheel.

6. In a vehicle adapted to travel with or without a bouncing or a rocking motion, a frame supporting said vehicle and operatively carrying an elongated straight axle member, a wheel mounted adjacent each end of said axle, each said wheel having a central hub portion defined by two plate elements spaced laterally one from another, and independent means carried by the plates of each said hub for adjusting the ends of said axle radially toward and away from the center of said wheels the same or different distances, the means carried by each said wheel comprising; a pair of parallel guide bars mounted intermediate said plates, a slide member slidably mounted intermediate said guide bars for radial movement toward and away from the center of said wheel, an elongated radial slot piercing both said plates and extending across the center of said wheel, said axle projecting through said radial slot and being carried by said slide member for movement therewith, and a pair of retention brackets secured to the outer face of one of said plates and overlying said guide bars, said brackets each having a laterally protruding, flexible flange portion, said flange portions together bounding a plurality of radially spaced recess means arranged to overlie said slot and engage said axle end to prevent inadvertent radial displacement of said axle end and said slide member.

7. In a vehicle adapted to travel with or without a bouncing or a rocking motion, a frame supporting said vehicle and operatively carrying an elongated straight axle member, a wheel mounted adjacent each end of said axle, each said wheel having a central hub portion defined by two plate elements spaced laterally one from another, and independent means carried by the plates of each said hub for adjusting the ends of said axle radially toward and away from the center of said wheels the same or different distances, the means carried by each said wheel comprising; a pair of parallel guide bars mounted intermediate said plates and spaced laterally one from another, a noncircular slide member slidably mounted intermediate said guide bars and intermediate said plates for radial movement toward and away from the center of said wheel, an elongated radial slot piercing both said plates and extending across and radially beyond the center of said wheel, said axle projecting through and beyond said radial slot and being carried by said slide member for movement therewith, and a pair of flexible retention brackets secured to the outer face of one of said plates and overlying said guide bars, said brackets each having a laterally protruding, contoured flange portion, said flange portions together bounding a plurality of radially spaced recess means arranged to overlie said slot and frictionally to engage said axle to prevent inadvertent radial displacement of said axle and said slide member, one of said recess means overlying the center of said wheel and the others thereof overlying points which are spaced varying distances out from said center whereby each of said wheels may be carried eccentric or concentric the longitudinal axis of said axle independent of the position of the other of said wheels.

References Cited in the file of this patent

UNITED STATES PATENTS

| | | |
|---|---|---|
| 605,182 | Johnston | June 7, 1898 |
| 883,746 | Robbins | Apr. 7, 1908 |
| 1,679,819 | Fageol | Aug. 7, 1928 |
| 2,388,441 | Ressinger | Nov. 6, 1945 |
| 2,482,827 | Black | Sept. 27, 1949 |
| 2,555,480 | Fischer | June 5, 1951 |

FOREIGN PATENTS

| | | |
|---|---|---|
| 286,256 | Germany | July 29, 1915 |